(12) United States Patent
Ellington, Jr. et al.

(10) Patent No.: US 6,175,569 B1
(45) Date of Patent: Jan. 16, 2001

(54) EXTENDING ASYNCHRONOUS TRANSFER MODE ATM QOS ACROSS LOCAL AREA NETWORKS

(75) Inventors: William W. Ellington, Jr., Raleigh; Francis E. Noel, Jr.; Lorrie A. Tomek, both of Durham, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 08/966,139

(22) Filed: Nov. 7, 1997

(51) Int. Cl.[7] .................................................. H04Q 11/04
(52) U.S. Cl. ........................ 370/401; 370/463; 370/466
(58) Field of Search .................................. 370/389, 395, 370/401, 405, 465, 466, 471, 474, 463; 709/245

(56) References Cited

U.S. PATENT DOCUMENTS

| | | | |
|---|---|---|---|
| 5,490,140 | * 2/1996 | Abensour et al. | 370/401 |
| 5,528,590 | 6/1996 | Iidaka et al. | 370/60.1 |
| 5,638,365 | 6/1997 | Sugita | 379/397 |
| 5,715,250 | 2/1998 | Watanabe | 370/395 |
| 5,732,071 | * 3/1998 | Saito et al. | 370/466 |
| 5,748,905 | * 5/1998 | Hauser et al. | 709/245 |

FOREIGN PATENT DOCUMENTS 2326306   12/1998   (GB) ............................. H04L/12/46

* cited by examiner

Primary Examiner—Chi H. Pham
Assistant Examiner—Frank Duong
(74) Attorney, Agent, or Firm—Daniel E. McConnell (57) ABSTRACT

Asynchronous Transfer Mode (ATM) network Quality of Service (QoS) guarantees are extended to Token Ring LAN stations. A LAN station originating a request for a connection through an ATM network to either a remote ATM station or a remote LAN station sends a frame having an encoded priority value to a LAN/ATM interface device. The device maps the priority value to one of the standard ATM traffic classes; namely, CBR, VBR, ABR and UBR. The LAN/ATM interface device attempts to set up a connection through the ATM network conforming to the mapped class or QoS. If the connection destination is another LAN station, a destination LAN/ATM interface device attempts to set up the final ATM-LAN phase of the connection.

15 Claims, 5 Drawing Sheets

| Token Ring Priority | ATM QoS |
|---|---|
| B'111' | No mapping. Used for high priority MAC frames |
| B'110' | Used by LAN/ATM IF Device |
| B'101' | CBR QoS |
| B'100' | VBR-RT (MPEG-1) QoS |
| B'011' | VBR-RT (MPEG-2) QoS |
| B'010' | VBR-NRT QoS |
| B'001' | ABR QoS |
| B'000' | UBR QoS |

EXTENDING ASYNCHRONOUS TRANSFER MODE ATM QOS ACROSS LOCAL AREA NETWORKS

FIELD OF THE INVENTION

The present invention relates to data communications networks and more particularly to methods and devices for extending Asynchronous Transfer Mode (ATM) network Quality of Service (QoS) guarantees to Local Area Network (LAN) stations.

BACKGROUND OF THE INVENTION

Networking technologies developed for the purpose of enabling data communications between remote users can generally be characterized as either local area network or wide area network (WAN) technologies. The manner in which data communications are handled in any particular network is quite different depending upon the particular technology employed.

LAN technologies were developed primarily to connect user stations located within a limited geographic area, such as a campus, a single building or even a limited area within a single building. One well known type of LAN technology is Token Ring technology. In a Token Ring network, individual LAN stations are connected to a transmission medium which provides a shared or common ring through which data is transmitted in a single direction. Data inserted onto the ring by a particular LAN station circulates through the ring, eventually returning to the originating station.

Token ring networks transmit data in variable length blocks or frames, each of which has a fixed format header used for routing and frame control. When an originating station wants to send data to another destination station on the ring, the originating station generates a frame including a header with its own address and the address of the destination station. The originating station's own address is included in a Source Address field while the address of the destination station is included in a Destination Address field.

When the originating station gains access to the ring, using a "token" as described below, it inserts the data onto the ring for transmission to the next LAN station on the ring. Each LAN station which receives the frame checks the frame's Destination Address field to determine whether it is the intended destination. If the receiving LAN station is not the intended destination, it forwards the message to the next LAN station on the ring. If the receiving LAN station is the intended destination, it copies the frame into a local buffer while forwarding the message to the next LAN station on the ring. The frame, after circulating around the entire ring, is removed at the originating station.

Token ring networks are considered peer-peer networks, meaning that any station is capable of accessing the ring without first gaining approval of a master station. In Token Ring networks, access control is provided through the use of a token, a special purpose frame, which circulates through the ring. A station acquiring the token is allowed to send a frame but must then send a free token to allow other stations a chance at access to the ring.

While Token Ring networks are quite effective in connecting users in a geographically limited area, there are limits on the number of users that can be connected to a single ring and to the length of that ring. WAN technologies have been developed to enable data communications among large numbers of users distributed throughout large geographic areas, including the entire planet.

Asynchronous Transfer Mode (ATM) is a particular type of WAN technology that has become of considerable interest due to its ability to successfully handle data traffic having considerably different service requirements and properties. A fundamental tenet of ATM technology is that all data, no matter what it represents, is transported in fixed length data units, commonly referred to as cells. The mandatory use of fixed length cells makes it possible to switch data at high speeds, using special hardware-based switches forming switching points distributed throughout the network.

Although the ATM cell structure may be standardized, the data transported in the cells can represent different types of information having different, sometimes inconsistent characteristics and transport requirements. Data being switched through an ATM network may represent alphanumeric information, audio (such as voice or music) information, and/or video (such as "live" video, photographs, graphic images or scan-producing medical images) information.

All types of data can be characterized in terms of tolerance to data losses and delays during transmission. A given type of data is considered loss-tolerant if moderate losses during transmission do not significantly degrade the information reconstructed from the data at its destination. Audio information is probably the best example of loss-tolerant information. Similarly, a given type of data can be characterized as delay-tolerant if moderate delays during transmission do not impair the usefulness of the information at the destination. Alphanumeric information is generally a good example of delay-tolerant information. Data having different loss and delay tolerances must be handled or serviced differently during transmission to avoid degradation of information reconstructed from the data at its destination.

To accommodate the different service requirements of different kinds of data traffic which can coexist in an ATM network, different classes of ATM traffic have been defined. The defined classes of interest are CBR (Constant Bit Rate), VBR (Variable Bit Rate), ABR (Available Bit Rate) and UBR (Unspecified Bit Rate).

CBR traffic is traffic that needs to be transmitted at a predictable, substantially constant bit rate. Examples of CBR traffic include real-time audio or video traffic or an ATM network connection emulating a standard Ti (1.544-Mbit/s) line. CBR traffic is delay and jitter intolerant. During setup of a CBR connection, a Peak Cell Rate (PCR) must be negotiated to define the maximum rate at which data can be transported without creating a significant risk of cell loss. Data is typically then transmitted at the negotiated PCR rate. If an attempt in made to transmit traffic at a rate exceeding the PCR, the excess traffic may be discarded by the network.

VBR traffic includes two subclasses of traffic - VBR real-time (VBR-RT) and VBR non-real-time (VBR-NRT). VBR-RT traffic is traffic which may be generated at varying rates (that is, be bursty) while still being subject to tight limits on acceptable cell jitter; that is, cell-to-cell variations on arrival times. Examples of VBR-RT traffic include video signals generated by a variable-rate codec or aggregated voice traffic with silence removal. VBR-NRT traffic is traffic which may be bursty but which is more delay tolerant than VBR-RT traffic. An example of VBR-NRT traffic includes traffic resulting from transaction processing, such as credit verification or other point-of-sale operations.

For each VBR connection, a Peak Cell Rate, a Sustained Cell Rate (SCR) and a jitter tolerance value is negotiated during the connection setup process. The negotiated SCR represents an upper bound for the average throughput over the connection. While traffic can be accepted from a VBR source at rates exceeding the negotiated SCR for short periods of time (as long as the excess rates don't exceed the negotiated PCR), the rate at which traffic will subsequently be accepted from the same source must be reduced below the SCR sufficiently to maintain the negotiated SCR over a longer period of time. To assure that the SCR parameter can be observed over a relatively long period of time, still another parameter, a burst tolerance, is established when the connection is being set up. Burst tolerance defines how long a VBR connection will be allowed to accept traffic at rates greater than SCR before the traffic rate is reduced below SCR to maintain an overall throughput not exceeding SCR.

ABR service attempts to exploit the availability of network bandwidth that becomes available due to the lack of CBR or VBR traffic. ABR implementations utilize traffic management techniques to monitor actual or incipient network congestion which might, if not taken into account, lead to unacceptable cell loss during transmission attempts.

The setup of an ABR connection requires negotiation of the same kind of PCR parameter that exists for a VBR connection. For both kinds of connections, the PCR parameter limits the maximum rate at which traffic will be accepted for transmission over the connection. Jitter or burst tolerances are not negotiated for ABR traffic. Instead, the ABR source and the network negotiate a Minimum Cell Rate (CR) parameter that represents the minimum amount of connection bandwidth that will always be available to the ABR traffic source. Generally, the MCR parameter represents the minimum transmission rate which must be available if the ABR traffic source or application is to stay alive; that is, continue to execute.

The UBR class of service has the lowest priority of any class of ATM traffic and is often referred to as a "best effort" service. Since UBR traffic is allocated only whatever network bandwidth is left over after the requirements of higher priority (CBR, VBR and ABR) classes of ATM traffic are satisfied, the network will use its "best effort" to deliver UBR traffic while providing no delay or loss guarantees.

The commitments or bandwidth guarantees which are created as part of an ATM connection setup process reflect a Quality of Service (QoS) associated with each connection. It is inherent in the class or QoS definitions that cells being transported over a virtual connection having one QoS may have higher priority than cells being transported over another virtual connection having a different QoS.

Source and destination stations for ATM traffic which are themselves part of an ATM network can readily negotiate ATM connection parameters required for the different QoS's. A problem is that many potential users of an ATM network are external to the ATM network. These potential users include many who are connected only indirectly to the ATM network through stations attached to shared LAN media, such as the Token Ring discussed earlier, or perhaps a dedicated LAN segment at a LAN switch. Current LAN implementations and standards do not provide any mechanism for allowing a LAN user who wants to establish a connection through an ATM network to request particular ATM connection characteristics even where the user has definite service requirements for the data to be transmitted. Similarly, current LAN implementations do not allow a WAN to extend ATM QoS guarantees from an ATM network to a destination LAN station.

SUMMARY OF THE INVENTION

The present invention supports establishment of end-to-end QoS guarantees where data is being transferred from an originating LAN station through an intermediate ATM network to a destination LAN station. Each LAN station is connected to an access point to the ATM network through LAN/ATM interface device. The device includes a buffer for storing a LAN frame received from the LAN station. Each frame includes a priority field encoded with a particular priority value. The device further includes logic for extracting the encoded priority value and for mapping it to a QoS associated with a particular ATM class of traffic. The device responds to the mapped QoS value to initiate setup of an ATM connection having appropriate parameters.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying claims wherein:

DESCRIPTION OF THE PREFERRED EMBODIMENT

Figure 1:
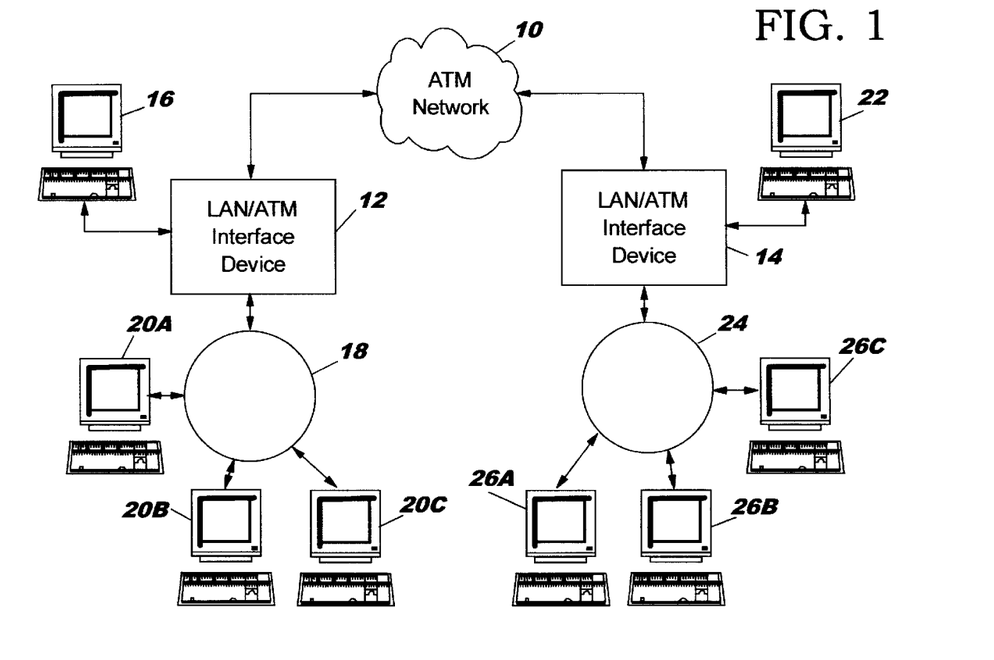
FIG. 1 is a schematic representation of a data communications network including an ATM backbone wide area network and at least two local area networks.

Referring to FIG. 1, the present invention is used in an environment including an ATM backbone network 10 connecting remote LAN users through at least two LAN/ATM interface devices 12 and 14. LAN users and a LAN/ATM interface device may be attached to the same shared LAN media As specific examples, LAN stations 20a, 20b, 20c are connected indirectly to interface device 12 through an intervening Token Ring 18 while LAN stations 26a, 26b and 26c are connecting to interface device 14 through an intervening Token Ring 24. While the illustration shows a symmetrical network with the same arrangement of LAN stations at both sides of backbone network 10, the invention is certainly applicable to asymmetric networks as well; that is, to networks having dissimilar LAN station arrangements at different points of connection to the backbone network.

Alternatively, one or more LAN stations may be connected directly to the adjacent interface devices. As examples, LAN stations 16 and 22 may be connected directly to interface devices 12 and 14, respectively through what are called dedicated LAN segments. Although it may not be readily apparent at first, there are advantages to allowing LAN workstations to be connected directly to the interface devices. Because Token Ring technology is well established, users may have a considerable investment in programs written for a Token Ring LAN environment. These "legacy" LAN programs can be executed even in a single directly-attached station, such as station 16, without incurring costs normally associated with installing and maintaining shared media.

Figure 2:
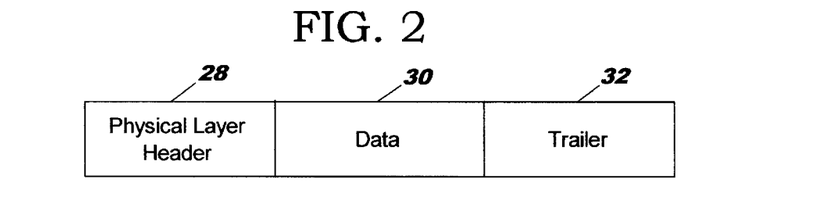
FIG. 2 is representation of the major elements of a Token Ring frame.

Whether attached directly or indirectly to the adjacent interface device, each LAN station exchanges data with the interface device using a standard Token Ring frame. FIG. 2 is a schematic representation of the three major elements of a standard Token Ring frame. Each frame includes a physical header 28 containing a starting delimiter, access control information and addressing information, a variable length data field 30 and a trailer 32 which includes error checking information and an ending delimiter. Detailed information about the fields of a Token Ring frame are available from a number of public sources, including current versions of IEEE 802.5 standards documents.

Figure 3:
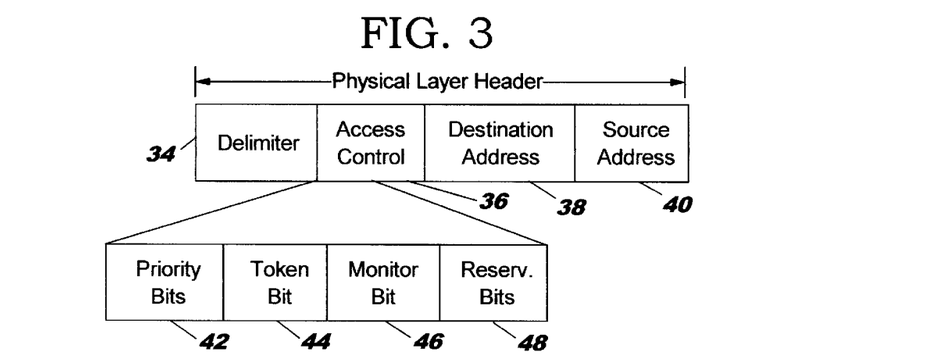
FIG. 3 is a slightly more detailed representation of fields contained in the physical header of a Token Ring frame.

For purposes of the present invention, only the physical layer header of a Token Ring frame is of interest. As shown in FIG. 3, the physical layer header of a Token Ring frame includes a one byte starting delimiter 34, a two byte access control field 36, a six byte destination address field 38, and a six byte source address field 40. Generally speaking, the contents of the access control field 36 are used to identify the frame format and function while the address fields 38 and 40 identify, respectively, the LAN station for which the frame is intended and the LAN station at which it originated. The first byte of the access control field is discussed in detail below. Detailed information about the formats and uses of the remaining byte in the access control field and of other fields in the physical header are available from the sources noted above but is not included here as such information is not needed to understand the present invention.

The first byte of the access control field is broken down into a number of subfields. The first three bits 42 are a frame priority subfield which will be discussed in detail below. The next subfield 44 is a single token bit which is used to identify the frame either as a token frame or as a data-carrying frame. The next subfield 46 is a single monitor bit which can be used for error recovery purposes. The last subfield is a three bit reservation subfield which can be used to convey information about the next token to be issued. The frame priority subfield 42 is the only subfield of interest to the present invention.

In Token Ring networks, as presently implemented, only two priority levels of the eight available levels are utilized. The higher priority level (typically B'111') is assigned to Media Access Control (MAC) frames. An example of this type of frame is an Active Monitor Present MAC frame, which is used for error detection/recovery purposes. The lower priority level (typically B'000') is used for user data frames.

In accordance with the present invention, the frame priority subfield is exploited to permit an originating LAN station to request ATM connections having specified QoS parameters. The invention is implemented in the LAN/ATM interface devices, such as device 50 shown in FIG. 4. Each LAN/ATM interface device includes an ATM interface component 52 for establishing ATM connections into the remainder of the ATM network cloud and a LAN interface component 54 for presenting a LAN appearance to LAN stations attached either through a ring or a dedicated LAN segment. LAN frames are temporarily stored in frame buffers 58 at the LAN interface while ATM cells are temporarily stored in cell buffers 56 at the ATM interface. In a preferred embodiment, the LAN/ATM interface device is implemented as a special purpose data processing device including a processor 60 and system memory 62. The buffers 56 and 58, while shown as separate components, could also be implemented by allocating memory locations in the system memory 62.

Figure 4:
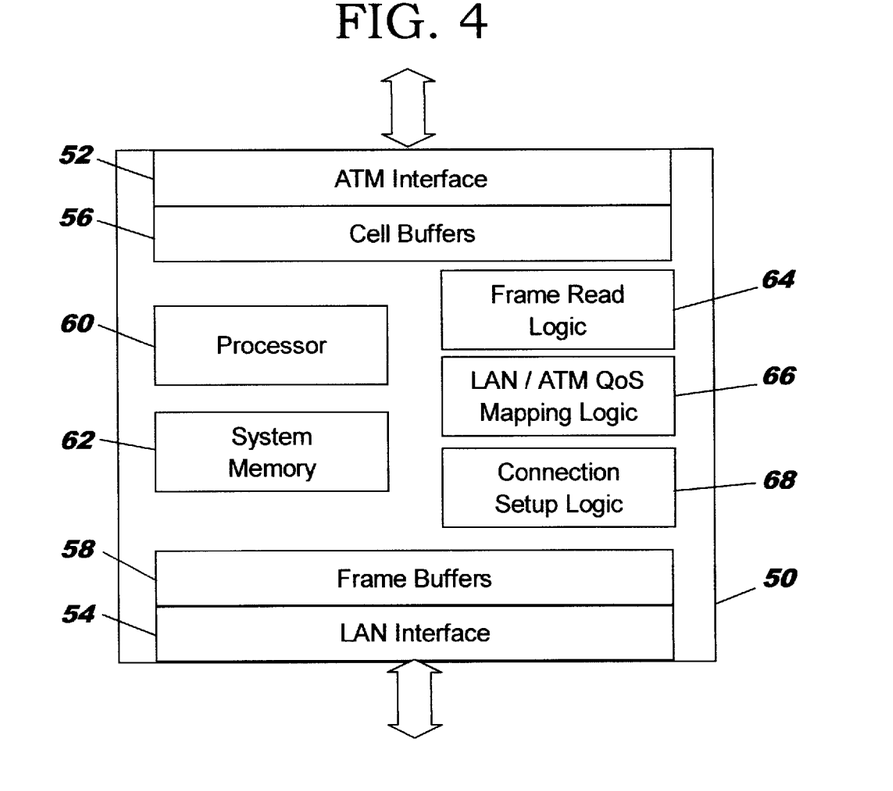
FIG. 4 is a block diagram of the major functional components of a LAN/ATM interface device for implementing the present invention.

The LAN/ATM interface looks like any other LAN station to the LAN and necessarily includes frame reading logic 64. Unlike conventional LAN stations, however, the LAN/ATM interface device also includes LAN/ATM QoS mapping logic 66 and connection setup logic 68. The roles played by logic 66 and 68 will be apparent from the following description.

Where an originating LAN station generates data traffic destined for a remote LAN station accessible through an intervening ATM network, the originating LAN station can request particular connection characteristics through the use of the frame priority subfield in the Token Ring frame. As noted earlier, the frame priority subfield is a three bit field which is not fully utilized in current Token Ring implementations.

Figure 5:
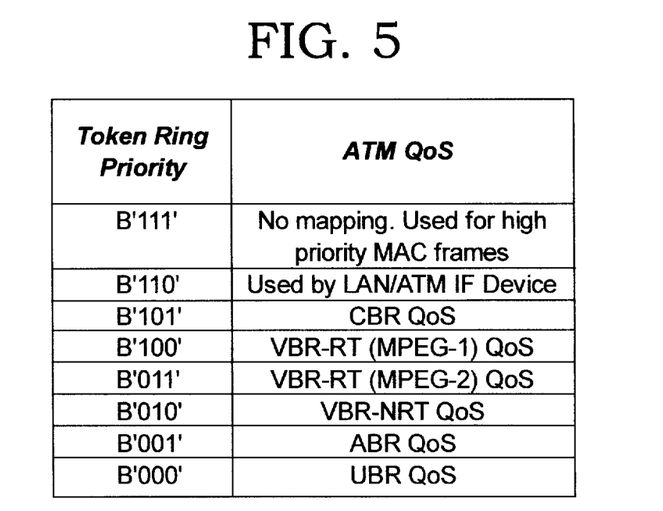
FIG. 5 is a table providing a mapping between possible Token Ring frame priority values and different ATM QoS's.

Referring to FIG. 5, the present invention exploits the availability of the frame priority subfield by mapping several of the available priority values to existing ATM QoS connection classes. The highest frame priority value (B'111') is excluded from the mapping and continues to be used to identify high priority MAC frames. The next lower priority value (B'110') is used by the local LAN/ATM interface device to send frames from the ATM network to LAN destination stations. The remaining priority values can be mapped directly to existing ATM QoS with successively lower priority values representing successively lower priority ATM QoS. As specific examples, the highest uncommitted priority value (B'101') is mapped to the ATM CBR connection class while the lowest available priority value is mapped to the ATM UBR class. The preferred mapping is shown in the drawing. It should be noted that two priority values are assigned to the ATM VBR-RT connection class with the higher of the two being dedicated to connections for MPEG-1 class data traffic and the lower being dedicated to connections for MPEG-2 class data traffic. These priority definitions provide the LAN/ATM interface device guaranteed/bounded access to the LAN segment to deliver frames originating across the ATM network.

Figure 6:
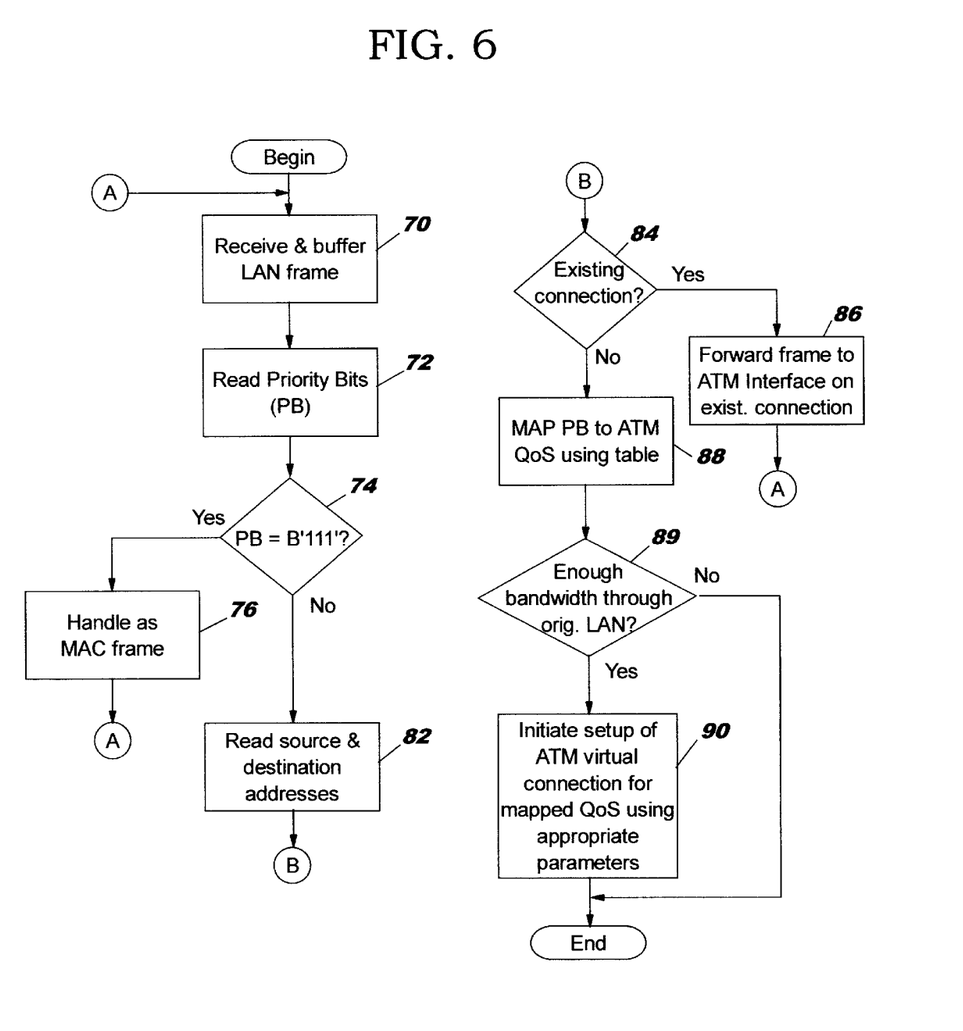
FIG. 6 is a flow chart of steps that are performed in a LAN/ATM interface device at a source when establishing a connection having a particular QoS from an originating LAN station.

FIG. 6 is a flow chart of steps that are performed at a LAN/ATM interface device in establishing a LAN-ATM-LAN connection having particular ATM QoS requirements. LAN frames originating at local LAN stations are received (block 70) and temporarily stored in a buffer memory. The frame priority subfield in the frame is read (block 72). Once the three priority bits stored in the subfield have been extracted, an initial determination (74) is made as to whether the priority bit pattern is that associated with a high priority MAC frame; namely B'111'. If the frame is identified as a high priority MAC frame, it is processed as such (block 76) and the program waits for the next frame to be received.

If the priority bit pattern is anything other than B'111', the source and destination address fields of the frame are read (block 82) to enable a determination (block 84) as to whether the necessary connection between the source and destination was previously established. If the necessary connection already exists, the frame is forwarded into the ATM network over that connection.

If no existing connection is found, however, the LAN/ATM interface device accesses the LAN/ATM mapping table (block 88) to map the frame's priority value to an available ATM QoS. At this point, the LAN/ATM interface device must make a determination (operation 89) there is sufficient bandwidth available across the originating LAN segment to support the connection request. This determination is necessary since an originating LAN station will be unaware of other pending requests at the time of making its request. If operation 89 reveals that inadequate bandwidth exists across the originating LAN segment, the process is terminated immediately. If, however, sufficient bandwidth exists, a setup of the necessary connection through the ATM network is initiated (block 90) using connection parameters appropriate for the designated QoS.

Figure 7:
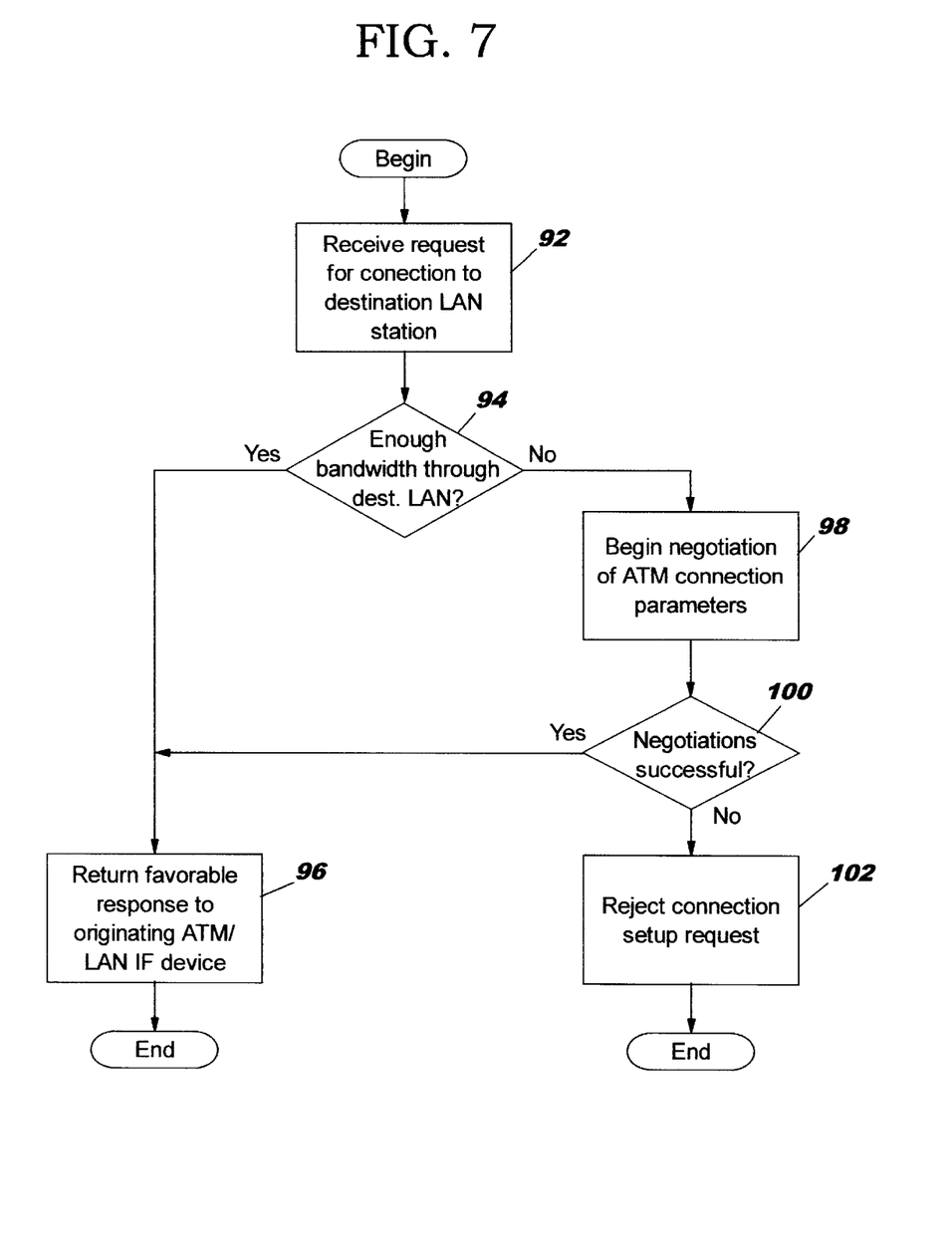
FIG. 7 is a flow chart of steps that are performed in a LAN/ATM interface device at a destination upon receipt of a connection setup request from a remote originating LAN station.

The process described above enables establishment of the first phase (LAN-ATM) of the LAN-ATM-LAN connection needed between two remote LAN users. The second phase of the process is performed at the LAN/ATM interface device between the ATM network and the destination LAN user. Referring to FIG. 7, the second phase starts (block 92) when a request is received from the LAN station to establish a connection to a LAN station that is local to the destination LAN/ATM interface device.

Upon receiving such a connection request, the destination LAN/ATM interface device checks (block 94) the currently available LAN resources to determine whether the destination LAN has sufficient bandwidth available to support the request. If sufficient bandwidth is known to be available, the destination LAN/ATM interface device returns a favorable response (block 96) to the originating LAN/ATM interface device. This action permits the originating LAN/ATM interface device to carry out the steps needed to actually complete the LAN-ATM-LAN connection.

If operation 94 does not reveal sufficient bandwidth to satisfy the connection request as originally received, the destination LAN/ATM interface device initiates negotiations (block 98) with the traffic source through the ATM network to determine whether connection parameters acceptable to both the originating and destination LAN/ATM interface devices can be established. Although not shown in FIG. 7, it should be understood that the negotiations process may involve multiple exchanges across the ATM network between the two LAN/ATM interface devices. For example, the destination LAN/ATM interface may respond to the originating LAN/ATM interface by proposing a different, less-demanding QoS or by proposing the same QoS but with less-demanding connection parameters.

If an operation 100 shows that the negotiations have been concluded successfully by establishment of mutually acceptable connection parameters, a virtual connection is established between the originating and destination LAN stations. If operation 100 shows that the negotiations failed and there is not sufficient bandwidth to support a connection request, the request is rejected in operation 102.

The above description assumes that two LAN stations want to establish communications through an intervening ATM network, which may be the most common use of the invention. However, the inventive principles apply where one of the end points is on a LAN and the other is in the ATM network. For example, where the originating station is on a LAN and the destination station is part of the ATM network, the process described with reference to FIG. 6 continues to apply except that the ATM response originates within the ATM network itself and not from any remote LAN station. Similarly, where the communication is initiated from a station which is part of the ATM network, the ATM network will generate the necessary connection parameters and propose a particular QoS to the destination LAN/ATM interface device.

Where the point of origination for the connection is within the ATM network, the network has the option of assigning the highest available LAN frame priority (B'110') to any communication to the destination user through the destination LAN/ATM interface device. Alternatively, the ATM network may institute QoS negotiations with the destination LAN station in the same way an originating LAN station might have done.

Figure 8:
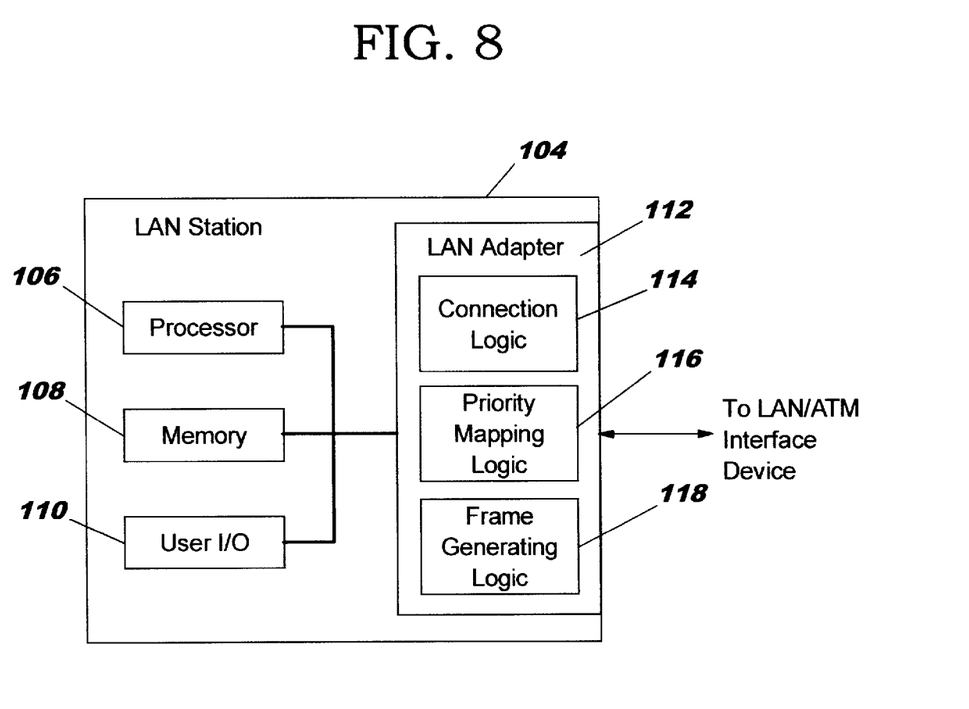
FIG. 8 is a block diagram of a LAN station showing components supporting the present invention.

Up to this point, the description has focussed on the LAN/ATM interface device and relatively littled has been said about the LAN stations that connect to that device. Clearly, any LAN station which is to make use of the invention must include certain basic components. Referring to FIG. 8, any LAN station 104 necessarily includes a processor 106, a memory 108 user input/output (I/O) elements, as well as an integrated or removable LAN adapter 112. Further, a LAN adapter necessarily includes frame generating logic 118 for formatting and generating LAN frames. The frame generating logic must be capable of writing one of the available frame priority values into the frame priority subfield in the physical layer header of the frame. In a basic embodiment, the generated frame would be transmitted to the LAN/ATM interface device, where priority mapping logic in the interface device would map the priority level to a particular ATM QoS as discussed earlier. FIG. 8 shows an alternate embodiment in which the LAN station itself includes explicit priority mapping logic 116. Including the priority mapping logic in the LAN station would permit a user application executing at the LAN station to specifically request a network connection satisfying a particular ATM QoS guarantee. The mapping logic in such a case would map the ATM QoS portion of the request to one of the previously-discussed available frame priority values, creating a standard Token Ring frame with a mapped frame priority value. This frame, when received at the LAN/ATM interface device, would be re-mapped back to a ATM QoS corresponding to that requested by the user application. The LAN/ATM interface device would respond to such a frame as described earlier without knowing or caring that the original connection request actually contained the desired ATM QoS.

The present invention has several advantages. One is that it is applicable whether the token-ring stations are connected to their LAN/ATM interface devices through shared media or dedicated segments. Another is that the mapping mechanism operates to provide each LAN/ATM interface device with traffic requirements of attached LAN stations without using complex signalling. Finally, LAN stations implementing the present invention can co-exist on LAN networks with older LAN stations in which the invention has not been implemented.

While there has been described what is considered to be a preferred embodiment of the present invention, variations and modifications therein will occur to those skilled in the art. Therefore, it is intended that the appended claims shall be construed to include both the preferred embodiment and all variations and modifications that fall within the true spirit and scope of the invention.

What is claimed is:

1. For use at an interface between a Local Area Network (LAN) station and an Asynchronous Transfer Mode (ATM) network, an apparatus for establishing a connection having a specified Quality of Service (QoS), said apparatus comprising:

a) a buffer for storing a LAN frame received from the LAN station, said frame having a priority field in which one of a set of known frame priority values is stored;

b) frame reading logic for extracting a value stored in the priority field of a frame;

c) mapping logic responsive to an extracted value to select an ATM QoS from a set of known ATM QoS; and d) connection-setup logic responsive to the selected ATM QoS to initiate establishment of a virtual connection through the ATM network, said virtual connection having parameters appropriate for the selected ATM QoS.

2. An apparatus as set forth in claim 1 wherein said connection-setup logic response further includes:

a) transmission logic for forwarding a connection-setup request into the ATM network;

b) receive logic for detecting a connection-setup response from the ATM network; and c) connection logic for modifying the parameters of the requested connection as a function of the contents of the connection-setup response.

3. An apparatus as set forth in either claim 1 or claim 2 wherein the LAN is a Token Ring LAN.

4. An apparatus as set forth in claim 3 wherein said mapping logic maps the extracted frame priority value to an ATM class of service selected from Continuous Bit Rate, Variable Bit Rate, and Available Bit Rate classes of service in descending order of priority.

5. For use in an interface device connecting a Local Area Network (LAN) station and an Asynchronous Transfer Mode (ATM) network, a method of enabling the LAN station to initiate a connection through the ATM network having a particular ATM Quality of Service (QoS), said method comprising the steps of:

a) receiving a LAN frame from the LAN station, said frame having a priority field in which one of a set of known frame priority values is stored;

b) extracting the stored priority value from the frame priority field;

c) mapping the extracted priority value to an ATM QoS selected from a set of known ATM QoS values; and d) initiating setup of a connection through the ATM network using connection parameters appropriate to the selected ATM QoS.

6. A method as set forth in claim 5 further including the steps of:

a) transmitting a connection-setup request including the connection parameters into the ATM network;

b) detecting any connection-setup response from the ATM network; and c) responding to different connection parameters contained in the detected response to modify the connection request.

7. A method as set forth in claim 6 wherein the mapping step maps the extracted frame priority value to an ATM classes of service selected from the set of Continuous Bit Rate, Variable Bit Rate and Available Bit Rate classes of service in descending order of priority.

8. A LAN station including:

a) user request recognition logic for detecting a user connection request containing a frame priority value selected from a set of such values, each of the values in the set corresponding to an ATM QoS;

b) frame generating logic for generating a frame including a frame priority field containing the frame priority value identified in the user request; and c) transmission logic for sending the generated frame to a device at which the frame priority value is mapped to a corresponding ATM QoS.

9. For use in a LAN station, an adapter including:

a) user request recognition logic for detecting a user connection request containing a frame priority value selected from a set of such values, each of the values in the set corresponding to an ATM QoS;

b) frame generating logic for generating a frame including a frame priority field containing the frame priority value identified in the user request; and c) transmission logic for sending the generated frame to a device at which the frame priority value is mapped to a corresponding ATM QoS.

10. For use in a LAN station, a method of initiating a request for setup of a connection satisfying transmission requirements for a particular ATM QoS, said method including the steps of:

a) detecting a user request for establishment of a connection having a priority value selected from a set of such values, each of the values in the set corresponding to an ATM QoS;

b) generating a frame including a frame priority field containing the frame priority value identified in the user request; and c) transmitting the frame to a device at which the frame priority value is mapped to the corresponding ATM QoS.

11. For use in a LAN adapter for a LAN station, a method of initiating a request for setup of a connection satisfying transmission requirements for a particular ATM QoS, said method including the steps of:

a) detecting a user request for establishment of a connection having a priority value selected from a set of such values, each of the values in the set corresponding to an ATM QoS;

b) generating a frame including a frame priority field containing the frame priority value identified in the user request; and c) transmitting the frame to a device at which the frame priority value is mapped to the corresponding ATM QoS.

12. A LAN station including:

a) user request recognition logic for detecting a user request for establishment of a connection having a specified ATM QoS;

b) mapping logic for translating the specified ATM QoS into a LAN frame priority value selected from a set of possible frame priority values;

c) frame generating logic for generating a frame including a frame priority field containing the frame priority value resulting from the translation; and d) transmission logic for sending the generated frame to a device at which the frame priority value is re-mapped to the specified ATM QoS.

13. For use in a LAN station, an adapter including:

a) user request recognition logic for detecting a user request for establishment of a connection having a specified ATM QoS;

b) mapping logic for translating the specified ATM QoS into a LAN frame priority value selected from a set of possible frame priority values;

c) frame generating logic for generating a frame including a frame priority field containing the frame priority value resulting from the translation; and d) transmission logic for sending the generated frame to a device at which the frame priority value is re-mapped to the specified ATM QoS.

14. For use in a LAN station, a method of initiating a request for setup of a connection satisfying transmission requirements for a particular ATM QoS, said method including the steps of:

a) detecting a user request for establishment of a connection having a specified ATM QoS;

b) translating the specified ATM QoS into a LAN frame priority value selected from a set of possible frame priority values;

c) generating a frame including a frame priority field containing the frame priority value resulting from the translation; and     d) transmitting the generated frame to a device at which the frame priority value is remapped to the specified ATM QoS.

15. For use in a LAN adapter for a LAN station, a method of initiating a request for setup of a connection satisfying transmission requirements for a particular ATM QoS, said method including the steps of:

a) detecting a user request for establishment of a connection having a specified ATM QoS;

b) translating the specified ATM QoS into a LAN frame priority value selected from a set of possible frame priority values;

c) generating a frame including a frame priority field containing the frame priority value resulting from the translation; and     d) transmitting the generated frame to a device at which the frame priority value is remapped to the specified ATM QoS.

\* \* \* \* \*